United States Patent
Tepic

(10) Patent No.: US 9,759,067 B2
(45) Date of Patent: Sep. 12, 2017

(54) TURBO-ENGINE, PARTICULARLY INTERNAL COMBUSTION ENGINE

(75) Inventor: Slobodan Tepic, Zurich (CH)

(73) Assignee: AELLA SA, Zurich (CH)

( * ) Notice: Subject to any disclaimer, the term of this patent is extended or adjusted under 35 U.S.C. 154(b) by 382 days.

(21) Appl. No.: 14/116,830

(22) PCT Filed: May 10, 2012

(86) PCT No.: PCT/EP2012/002031
§ 371 (c)(1),
(2), (4) Date: Nov. 11, 2013

(87) PCT Pub. No.: WO2012/152447
PCT Pub. Date: Nov. 15, 2012

(65) Prior Publication Data
US 2014/0102115 A1    Apr. 17, 2014

(30) Foreign Application Priority Data

May 10, 2011  (EP) .................................... 11165479
Jun. 21, 2011  (EP) .................................... 11170776

(51) Int. Cl.
*F01D 1/34*  (2006.01)
*F01D 1/36*  (2006.01)
(Continued)

(52) U.S. Cl.
CPC ................ *F01D 1/34* (2013.01); *F01D 1/36* (2013.01); *F02C 3/05* (2013.01); *F02C 3/365* (2013.01);
(Continued)

(58) Field of Classification Search
CPC . F01D 1/34; F01D 1/36; F04D 17/161; F04D 5/001; F02C 3/05
See application file for complete search history.

(56) References Cited

U.S. PATENT DOCUMENTS 3,966,523 A * 6/1976 Jakobsen ............... B29D 22/00
156/169
4,402,647 A * 9/1983 Effenberger ............ F04D 5/001
415/90

(Continued)

FOREIGN PATENT DOCUMENTS

| GB | 1237532 | * | 6/1971 | ............. F01D 5/282 |
| GB | WO2009022103 | * | 2/2009 | ............... F01D 1/32 |
| JP | 2007198334 | | 8/2007 | |

OTHER PUBLICATIONS

Japanese Patent Application No. JP2014509636, "Office Action", dated Mar. 29, 2016, 6 Pages of Office Action and 7 Pages of English Translation.

*Primary Examiner* — Andrew Nguyen
(74) *Attorney, Agent, or Firm* — Kilpatrick Townsend & Stockton LLP

(57) ABSTRACT

The invention is directed to a turbo-engine, particularly internal combustion engine, comprising a housing and therein a bladeless turbine section (30; 42; 67) of the stacked disc- or Tesla-type construction, wherein the turbine section (30; 42; 67) has a plurality of closely spaced discs (32; 49; 61) arranged for common rotation about a rotation axis in the housing, said turbine section (30; 42; 67) is adapted for passing with tangential flow components a working fluid stream from a radially inner region to a radially outer region of said turbine section (30; 42; 67) while adopting energy from said working fluid stream for rotating the discs (30; 49; 61). Preferably, the turbo-engine further comprises a compressor section (40; 66) of the stacked disc- or Tesla-type construction having a plurality of closely spaced discs (45; 61) arranged for common rotation about said rotation axis and a combustion zone (41; 64), wherein said compressor section (40; 66) being arranged coaxially with—and radially inwardly of the turbine section (30; 42; 67) with the com- (Continued)

Figure 1:
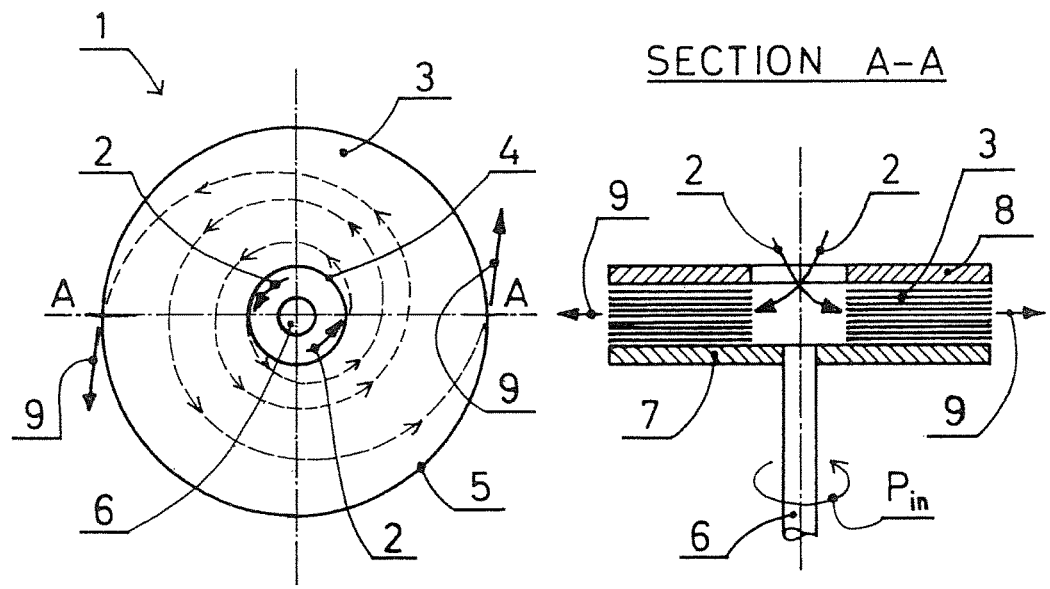

bustion zone (41; 64) provided radially between the compressor section and the turbine section.

2 Claims, 9 Drawing Sheets

(51) Int. Cl.
*F02C 3/05* (2006.01)
*F04D 5/00* (2006.01)
*F04D 17/16* (2006.01)
*F02C 3/36* (2006.01)

(52) U.S. Cl.
CPC ........... *F04D 5/001* (2013.01); *F04D 17/161* (2013.01); *Y02T 50/672* (2013.01)

(56) References Cited

U.S. PATENT DOCUMENTS

| | | | |
|---|---|---|---|
| 2003/0002976 A1* | 1/2003 | Dial | F01D 1/36 415/90 |
| 2005/0276681 A1* | 12/2005 | Avina | F01D 1/36 415/1 |
| 2006/0216149 A1* | 9/2006 | Wilson | F01D 1/34 416/4 |
| 2008/0102292 A1* | 5/2008 | Vontell | B08B 3/08 428/457 |
| 2009/0169873 A1* | 7/2009 | Louchet-Pouillerie | C04B 41/009 428/334 |

* cited by examiner (a)           (b)

TURBO-ENGINE, PARTICULARLY INTERNAL COMBUSTION ENGINE

PRIOR RELATED APPLICATIONS

This application is a National Phase application of International Application No. PCT/EP2012/002031 filed May 10, 2012, which claims priority to European Patent Application No. 11165479 filed May 10, 2011 and European Patent Application 11170776 filed Jun. 21, 2011, each of which is incorporated herein by reference in its entirety.

The present invention relates to a turbo-engine, particularly to an internal combustion engine comprising a housing an therein a bladeless turbine section of the stacked disc type or Tesla-type construction.

On Oct. 21, 1909, Nikola Tesla filed a patent application, which eventually led to two patents granted on May 6, 1913: U.S. Pat. No. 1,061,142 for "Fluid propulsion" and U.S. Pat. No. 1,061,206 for "Turbine", filed as a divisional application on Jan. 17, 1911. The key invention in both of these patents is a bladeless rotor comprising a stack of closely spaced discs. The working fluid interaction with the rotor is through viscosity of the fluid and its adhesion to the discs. While built and demonstrated by Tesla, both as pumps and turbines, and relatively well studied in modern times, Tesla's turbo-machines have found little commercial success. Conceptually simple and apparently easy to construct, in order to attain efficiencies on par with bladed machines, bladeless turbo-machines call for materials and technologies that were not available until very recently.

On Jan. 16, 1930, Frank Whittle filed a patent application in Great Britain, accepted on Apr. 16, 1931, as patent No. 347,206, "Improvements relating to the Propulsion of Aircraft and other Vehicles", describing a propulsion engine with a compressor driven by a turbine and a combustion chamber interposed between the two, expansion of the hot gases taking place in two stages, the first of which is in the turbine and the second is in the propelling nozzles. Whittle's invention has ultimately resulted in the modern day jet engine. An alternative design, with all of the hot gases expansion happening in the turbine, results in a so-called gas turbine, the excess power removed by the shaft to drive e.g. an electric generator, a ship propeller, or an airplane propeller.

On Jul. 6, 1960, William B. McLean filed a patent application in the U.S., granted on Jul. 24, 1962, as U.S. Pat. No. 3,045,428, "Vortex Gas Turbine". McLean uses the conventional scheme of a gas turbine, but relies on a Tesla-type compressor and a Tesla-type turbine. Elegant in design, with a combustion chamber facilitating formation of a vortex that improves combustion, the proposal of McLean suffers from the basic limitations on efficiency of Tesla's turbo-machines—high losses at the inlet into and the outlet from the compressor stage, as well as high losses at the inlet nozzles to the turbine (see e.g. Warren Rice: Tesla Turbomachinery, Proceedings, IV International Nikola Tesla Symposium, Sep. 23-25, 1991).

Kenneth Hicks' U.S. Pat. No. 6,973,792, granted on Dec. 13, 2005, does no better to address the fundamental issues of losses, nor does it solve the design issues of a Tesla-type rotor—claims of superior design for strength fail a closer inspection. And so do the claims of Guy Louis Letourneau in U.S. Pat. No. 6,692,232, granted on Feb. 17, 2004—presence of any holes in the discs will reduce the strength to the extent that no known material will support the rotational speeds needed to reach optimum conditions for Tesla-type rotors working with gaseous media.

The object of the herein disclosed invention is to overcome fundamental limitations of Tesla-type turbo-machines, particularly in a configuration typical of a gas turbine, or a jet engine according to e.g. Whittle, by eliminating the exit losses of the compressor and the inlet losses of the turbine, as well as reducing the inlet losses of the compressor.

To solve the objective in its most general meaning a turbo-engine with the described features is proposed.

Preferred embodiments of the invention are described herein.

Described herein is a method of operating a Tesla-type bladeless turbine with reverse flow of the working fluid compared with the conventional operation of a Tesla-type turbine.

A further key component of the current invention is an extremely thin composite rotor disc with uninterrupted tangentially wound fibers, preferably carbon fibers. The disc attains stiffness and maintains precise geometry under hoop stress generated by high rotational speed. To form a rotor a stack of these thin discs is kept together, separated and locked against rotational slip by a plurality of male/female spacers molded onto the discs without interrupting the tangentially wound fiber layout. The stack is kept under axial compression by end, thick plates connected at the central opening by a hub. The thickness of these end plates increases with radius in the axial direction, away from the disc stack, resulting in the bending moments generated by the centrifugal force, which tend to bend them towards the stack hence keeping the stack axially, dynamically compressed all the way to the periphery of the rotor. This avoids the need for axial fasteners used by Tesla and others and hence for drilling holes in the discs that would undermine their structural integrity. These inventions can be applied in production of any of the Tesla type machines, i.e. compressors, turbines as well as for the herein disclosed novel combination of a compressor, a combustion chamber and a turbine into a single disc stack. Technical solutions required to produce this highly novel internal combustion engine are disclosed in sufficient detail to allow those skilled in the art to construct it and put it to use.

Hereinafter, the present invention will be explained with reference to the drawings.

LIST OF FIGURES

Figure 2:
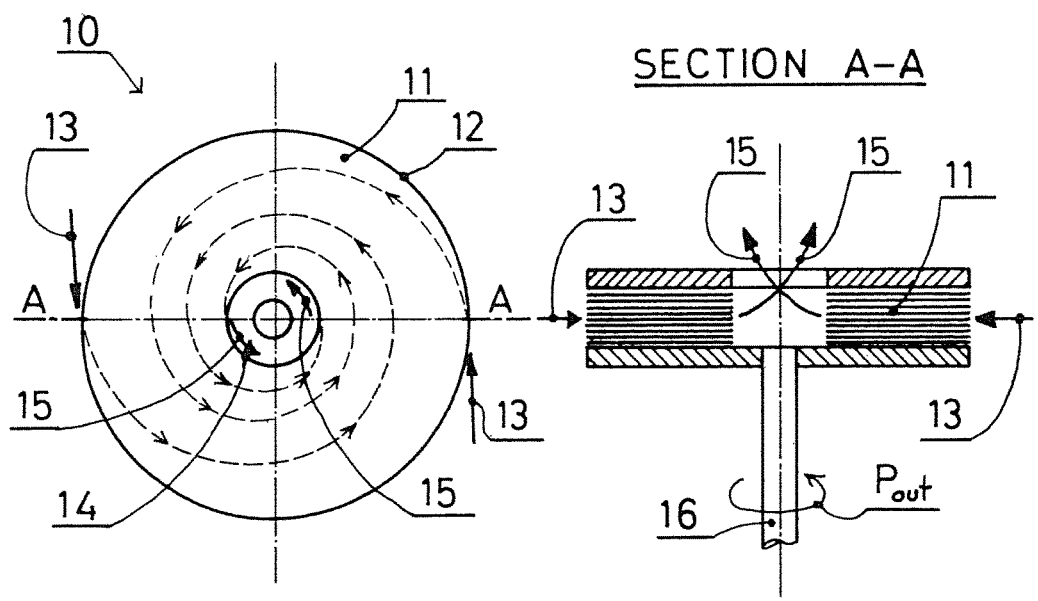
Figure 3:
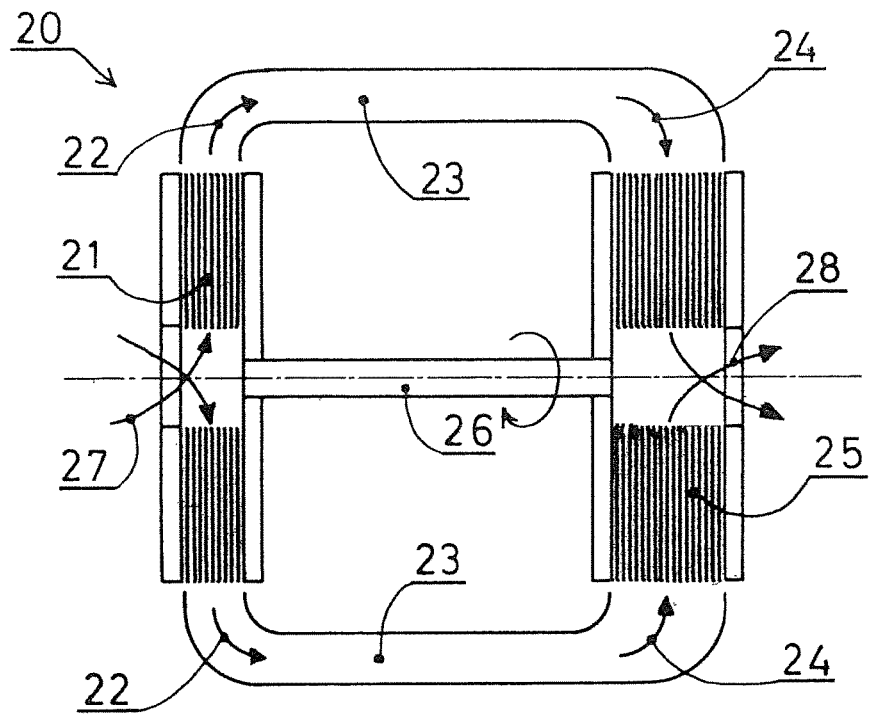
Figure 4:
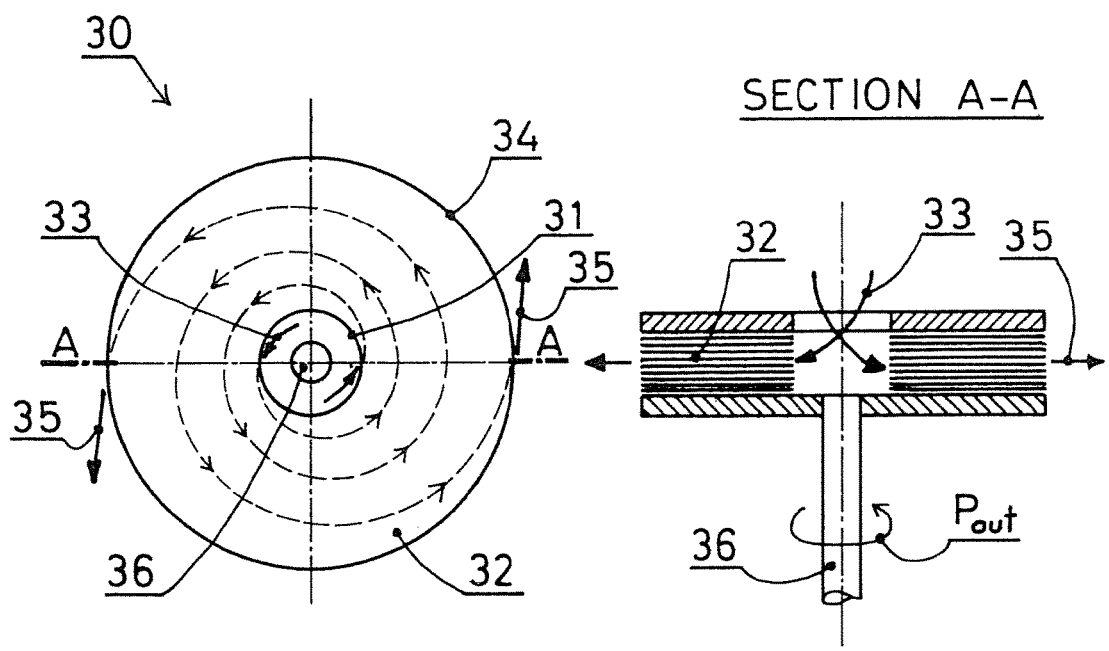
Figure 5:
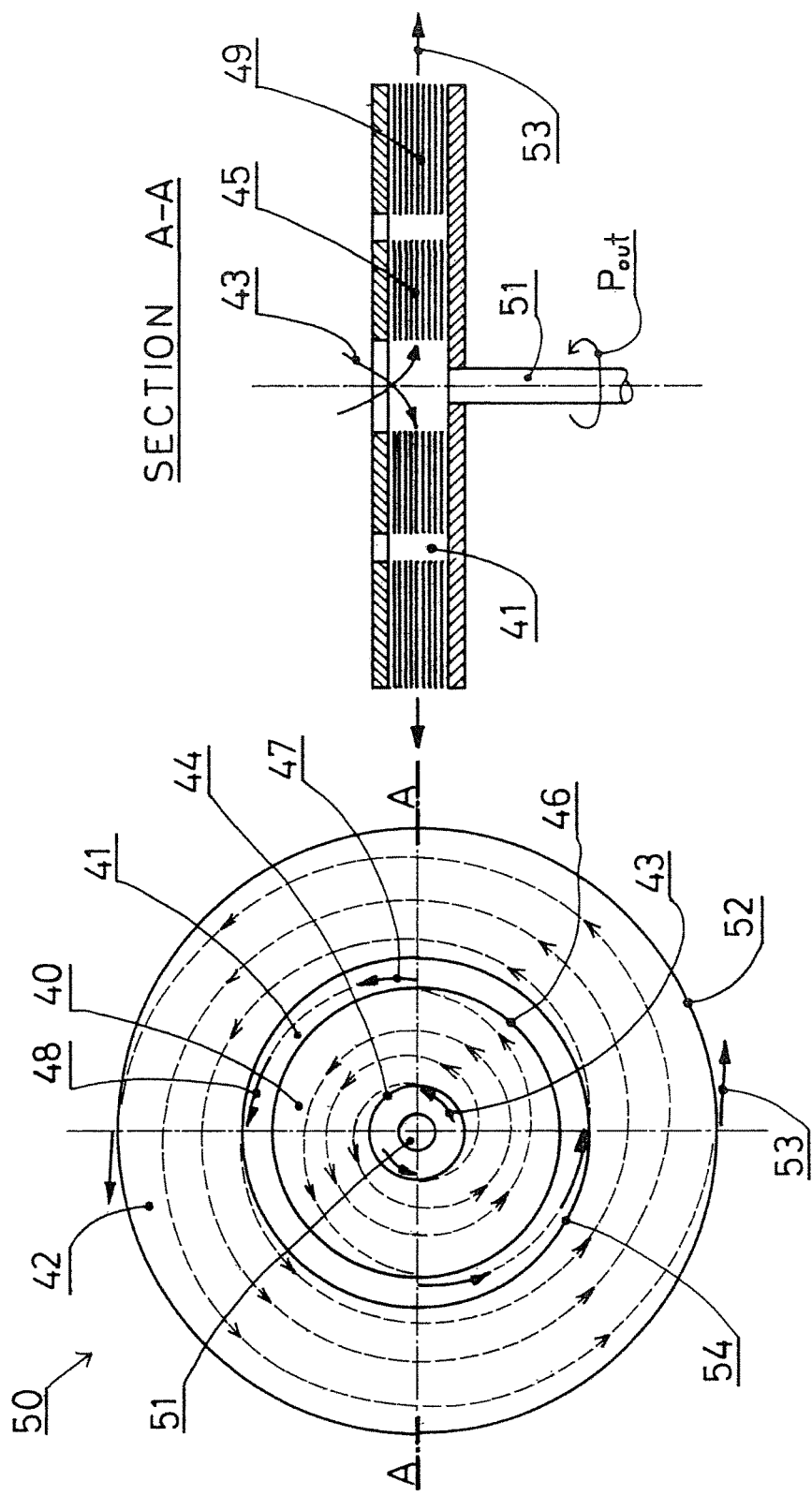
Figure 6:
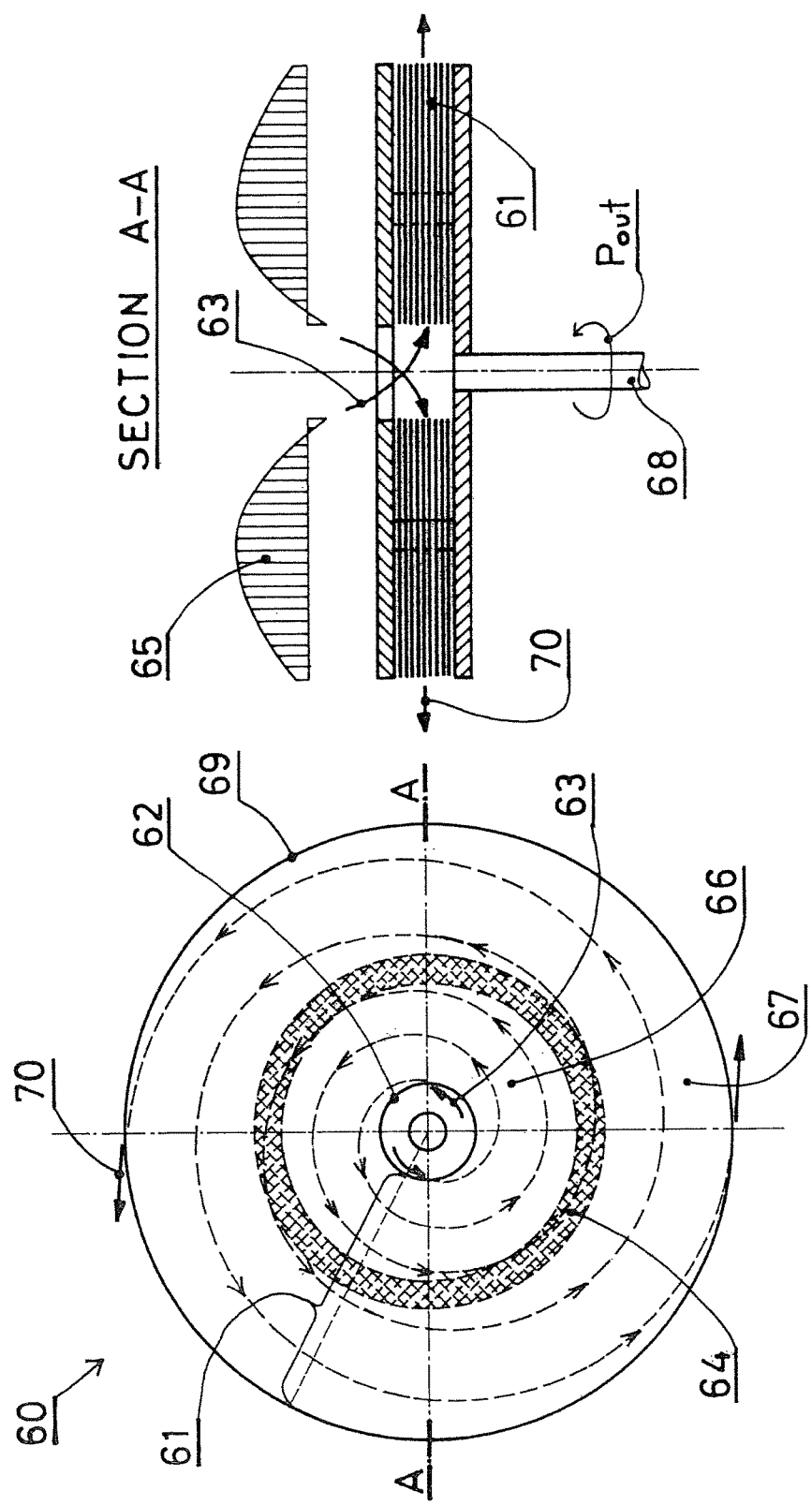
Figure 7:
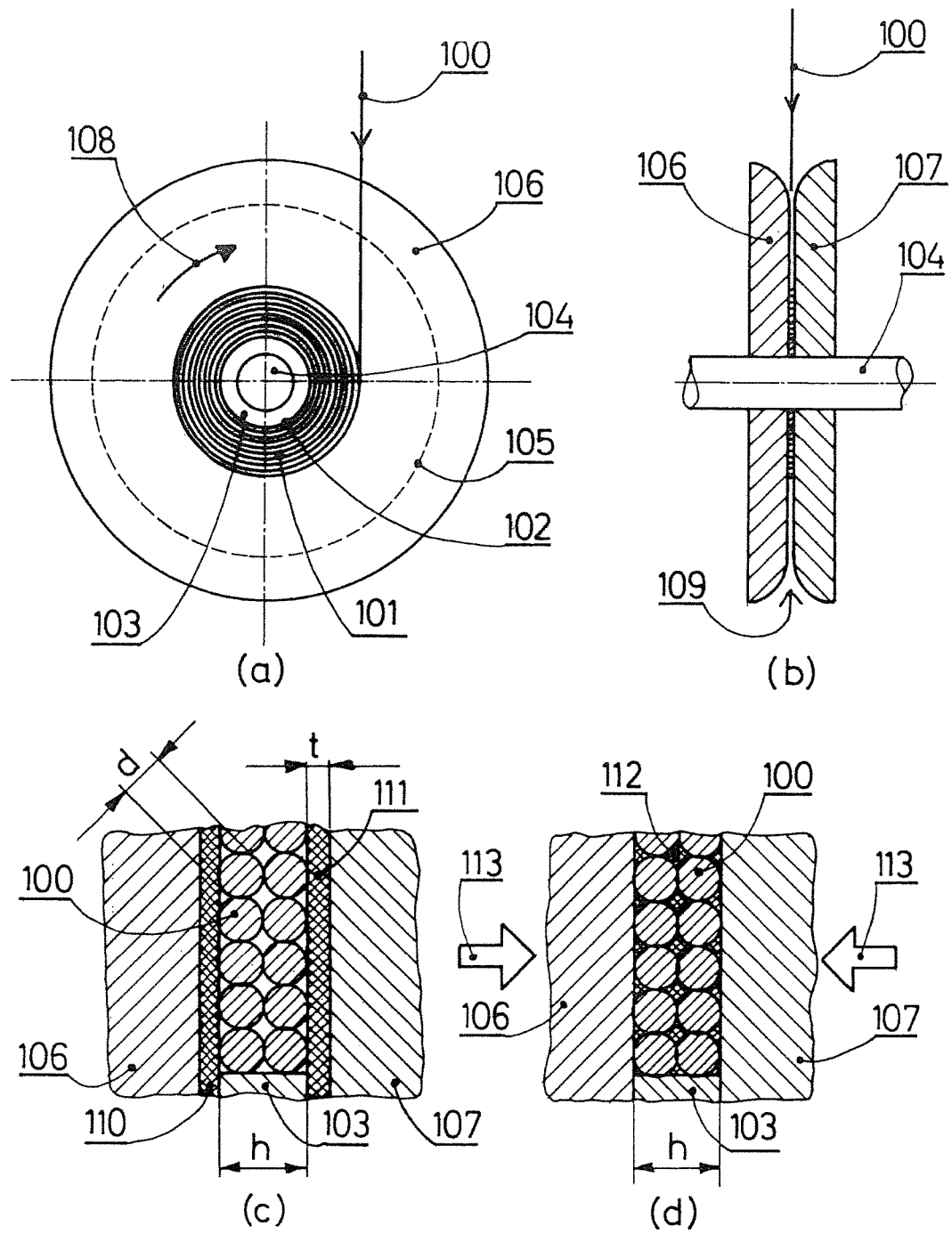
Figure 8:
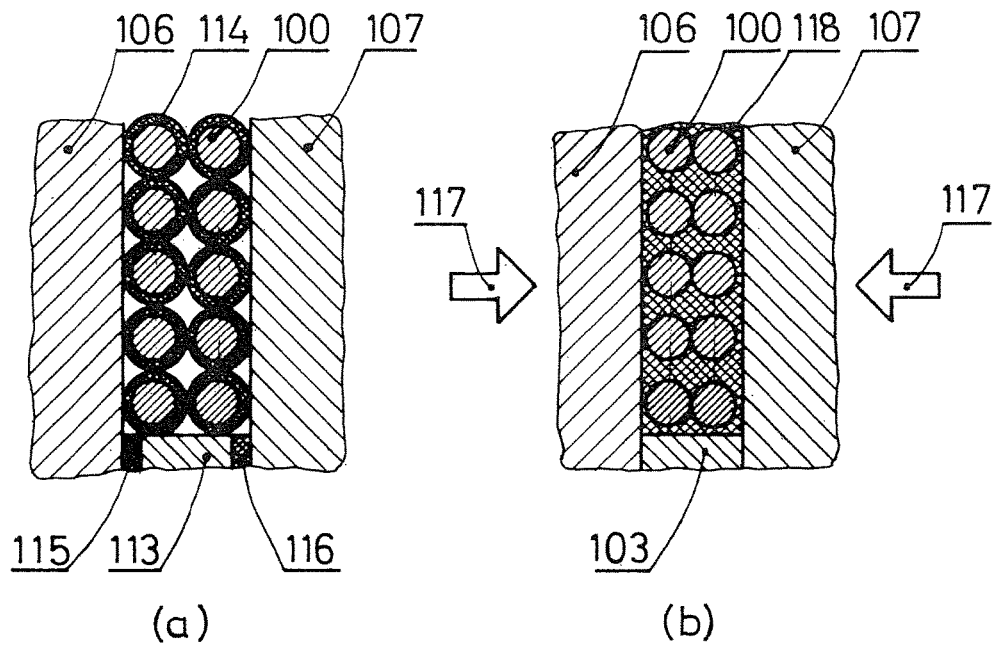
Figure 9:
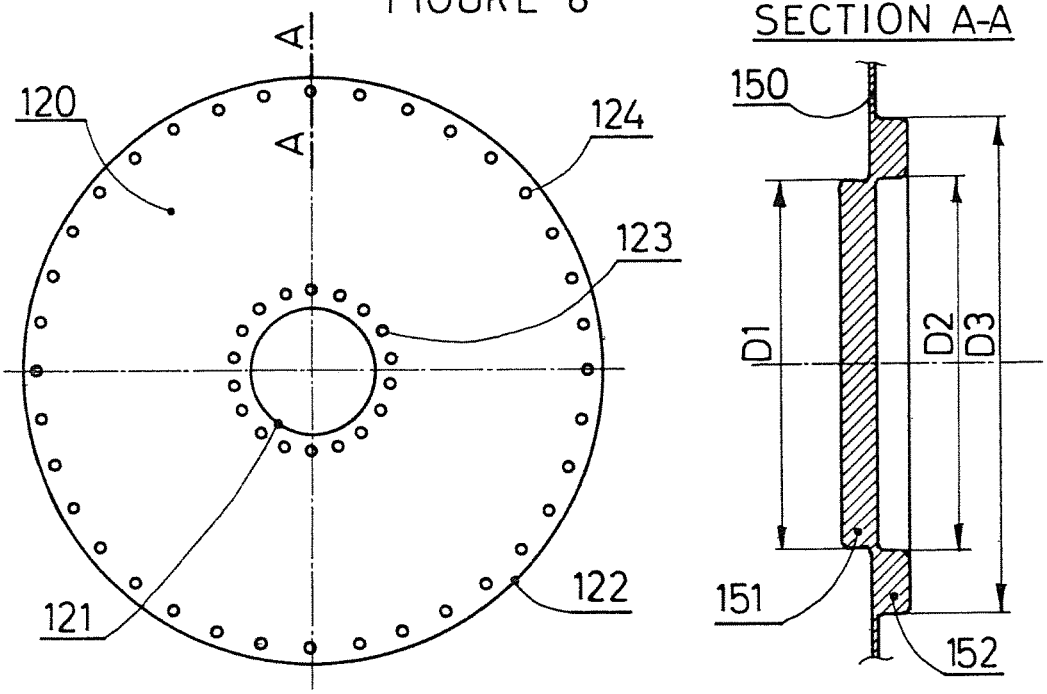
Figure 10:
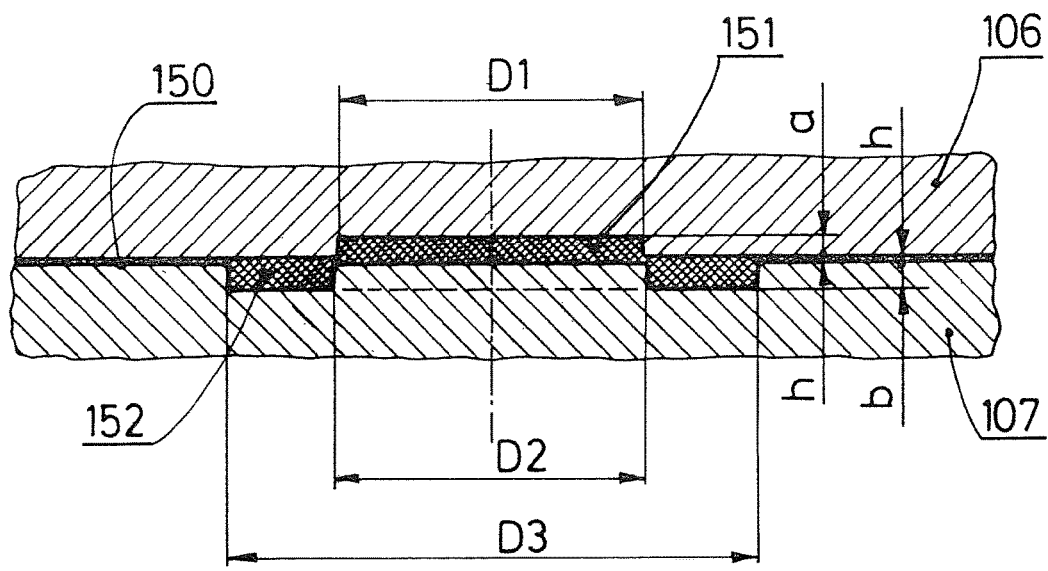
Figure 11:
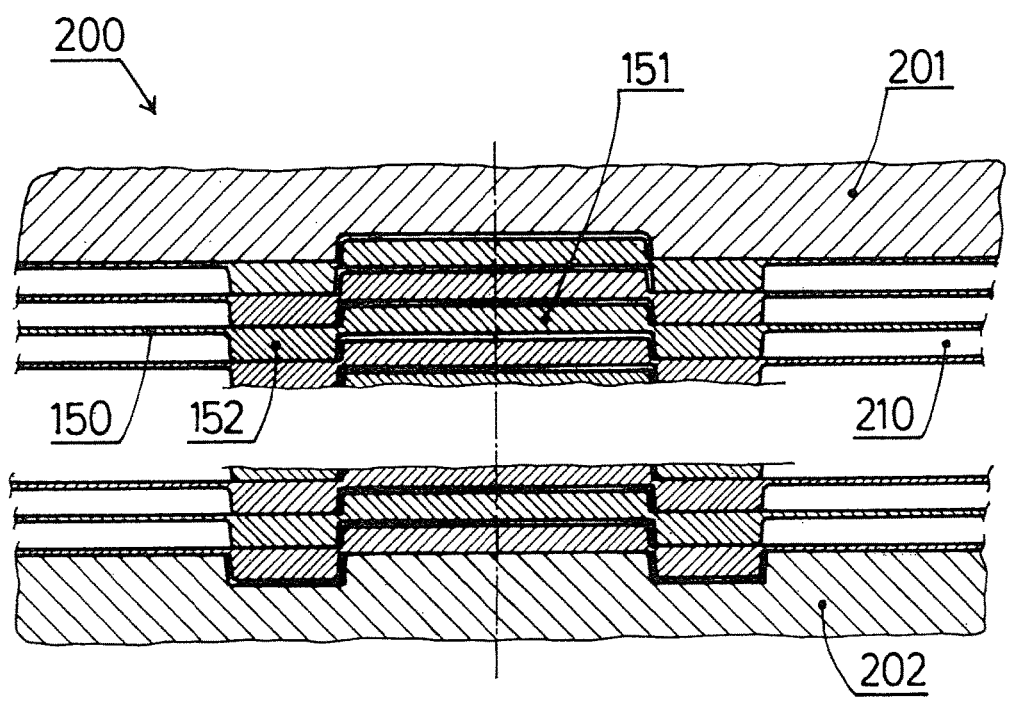
Figure 12:
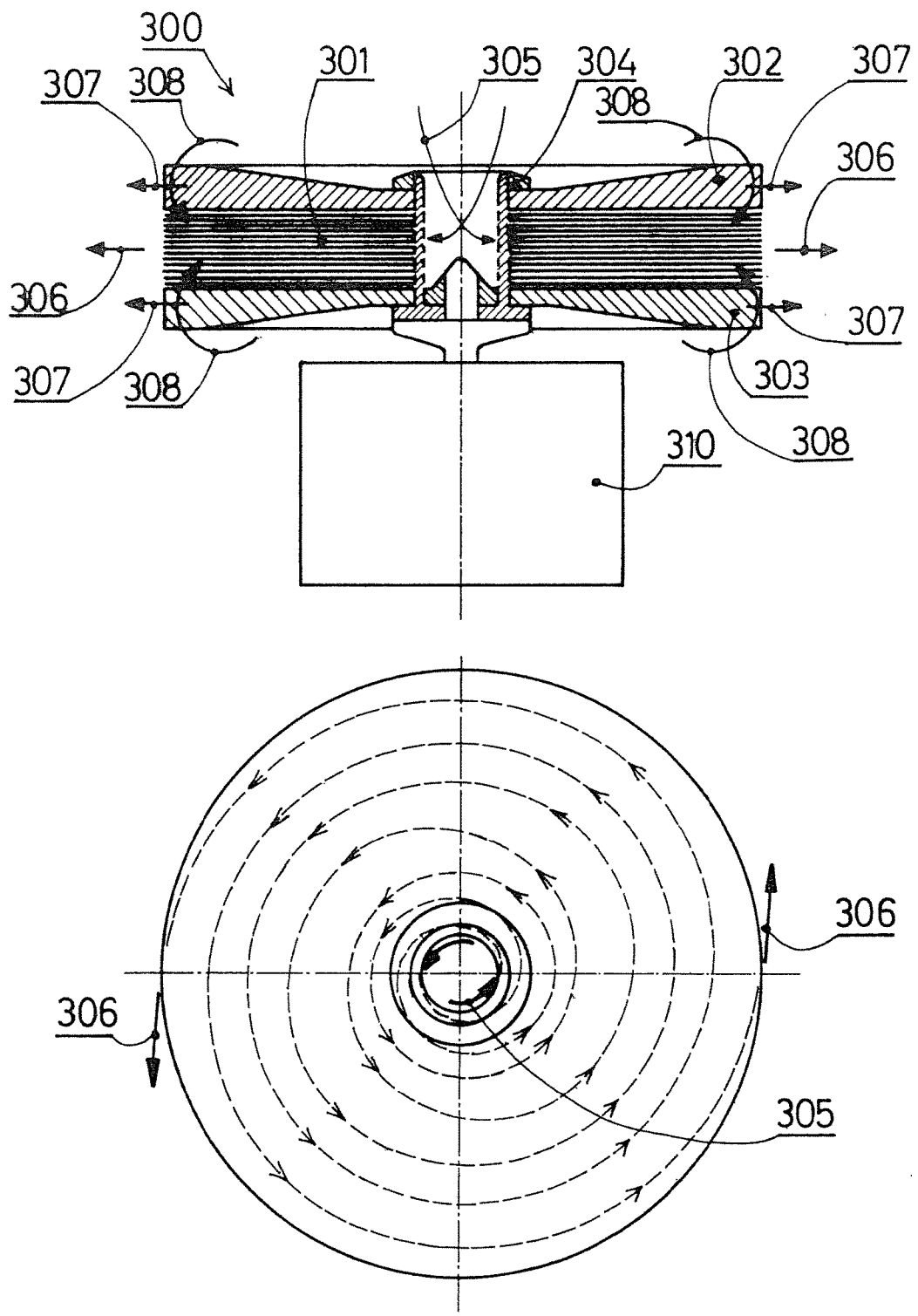
Figure 13:
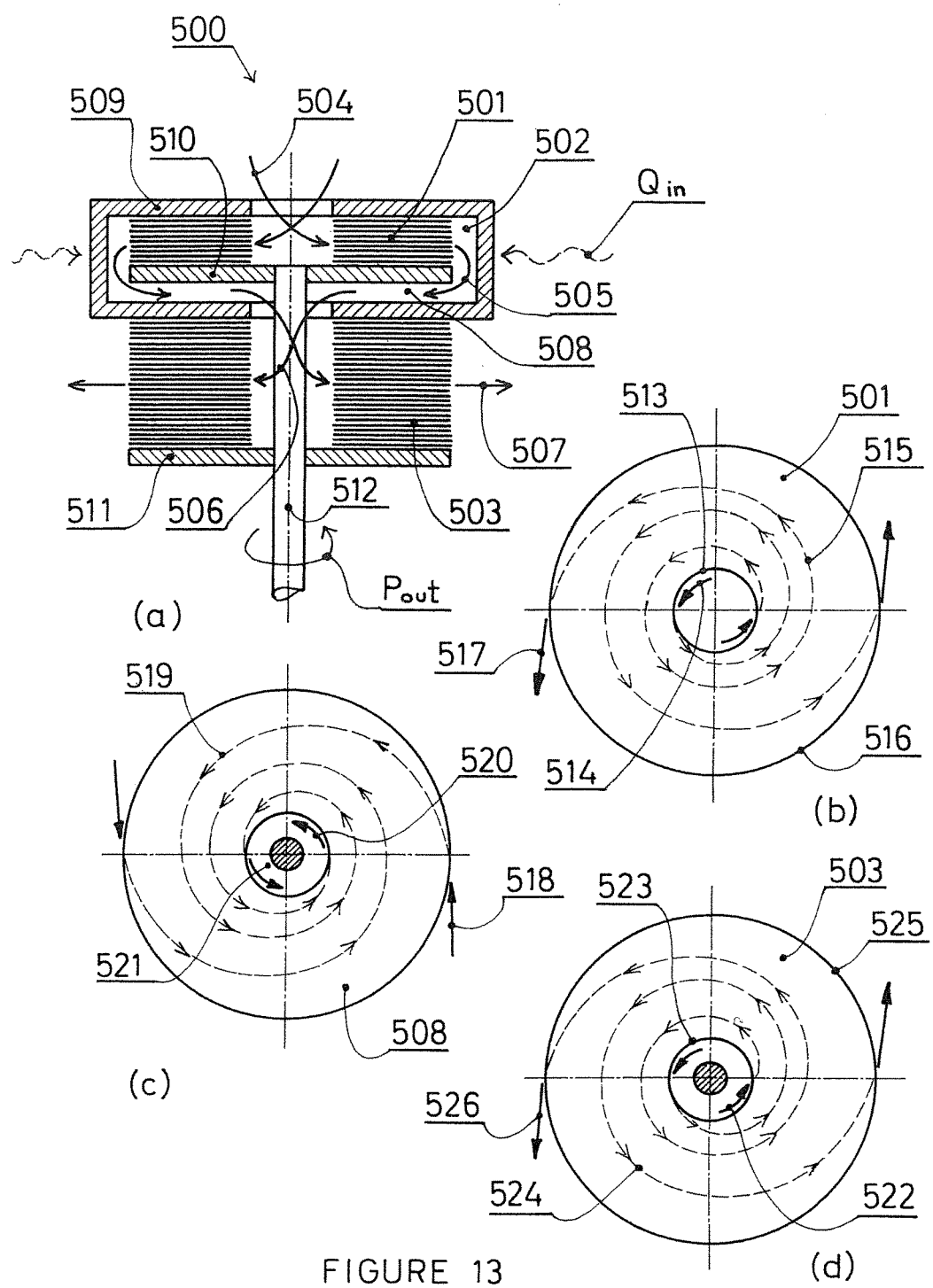

FIG. 1 Tesla-type turbo-compressor;

FIG. 2 Tesla-type turbine;

FIG. 3 Tesla-type gas turbine/jet engine;

FIG. 4 Reversed flow direction turbine according to this invention;

FIG. 5 Concentrically placed compressor and reversed flow turbine with an interposed combustion chamber according to this invention;

FIG. 6 Single disc stack combining the functions of a compressor, a combustion chamber and a turbine according to this invention;

FIG. 7 Construction of thin composite discs according to this invention with the matrix formed from thin foils;

FIG. 8 Construction of thin composite discs according to this invention with the matrix formed from the fiber polymeric coating;

FIG. 9 Thin disc with stack locking spacers;

FIG. 10 Molding of the disc spacers;

FIG. 11 A disc stack for the rotor;

FIG. 12 A rotor for turbo machines according to this invention;

FIG. 13 A turbo-engine with a compressor and a turbine according to the invention.

DESCRIPTION

For simplicity, on all drawings in this section, only a few discs will be shown—in reality, for most applications, the rotor may comprise hundreds, possibly thousands of discs.

FIG. 1 shows a disc compressor, or a pump, 1, according to Tesla: the fluid is drawn, as shown by arrows 2, into the disc stack, 3, at the central opening, 4, and thrown outwards to the periphery, 5, of the disc stack, 3. The power, $P_{in}$, is delivered via a shaft, 6, that supports the discs, according to Tesla by a set of spokes, but as an alternative, shown only schematically in this section of the disclosure and later in detail, the discs are stacked between two cover plates, 7 and 8. The fluid leaves the disc stack at the periphery, nearly tangential to the discs as shown by arrows 9. Again, for clarity, no housing is shown.

FIG. 2 shows a disc turbine, 10, according to Tesla: the fluid enters the disc stack, 11, tangentially on the periphery, 12, as shown by arrows 13, and leaves the stack via a central opening, 14, as shown by arrows 15. The power, $P_{out}$, is taken up via the shaft 16, which supports the discs. As noted by Tesla, the main distinction is that the centrifugal force in the compressor/pump acts in the same direction as the fluid moves, while in the turbine it opposes the fluid movement.

FIG. 3 shows a schematic arrangement, in a cross-section only, of a gas turbine, 20, of the kind proposed by e.g. McLean, or Hicks: a Tesla-type compressor, 21, pressurizes air, 27, through a diffusor, 22, into a combustion chamber, 23, which is then fed into tangential nozzles, 24, driving the turbine, 25, from the periphery towards the center. The shafts of the compressor and the turbine can be separated, possibly geared to spin at different speeds, or they can be combined into a single shaft, 26. Combustion gases leave the turbine through the central opening as shown by arrows 28.

Whatever the reasons, it appears that neither Tesla, nor anyone else after him, had considered operating the turbine by bringing the fluid at the central opening and letting it out at the periphery. If the working fluid is a hot gas such as is normally used to drive the turbine in a jet engine, in a gas turbine, or in a steam turbine, the path from inside out seems to offer advantages, which may result in an overall increased efficiency, since the working medium is cooling and expanding as it delivers power to the rotor through an increasing cross section, instead of being pushed through a decreasing cross-section when driven centripetally. Reversing the radial direction of the fluid flow in the turbine is one of the core innovations of the present invention. In view of the fact that a century has passed since Tesla' patent filing, this proposal appears to be all but obvious.

FIG. 4 shows a disc turbine, 30, with the fluid entering axially and then tangentially at the central opening, 31, of the disc stack, 32, as shown by arrows 33, leaving the disc stack at the periphery, 34, as shown by the arrows 35. The power, $P_{out}$, is taken up by the shaft 36.

FIG. 5 shows an arrangement for a gas turbine, 50, with a compressor, 40, a combustion chamber, 41, and a turbine, 42, arranged concentrically: the air and the combustion gasses move from the center outwards through all three components of the machine. The air, preferably pre-mixed with the fuel enters, as shown by arrows 43, via the central opening, 44, and leaves the compressor stack, 45, at its periphery, 46, as shown by arrows 47, into the combustion chamber, 41, basically tangentially. Combustion creates back pressure for the compressor while the hot gases enter, tangentially as desired for the best performance, and shown by arrows 48, the turbine stack, 49. The turbine and the compressor stacks could be fixed on a common shaft, 51, but alternatives are possible with gearing the shafts to spin at different speeds. The gases leave the turbine stack at the periphery 52. Tangential velocity of the outflow, 53, can still exceed the speed of the turbine disc at its periphery, and hence add to the shaft torque, because the combustion gases cool and expand on their way through the turbine disc stack.

FIG. 6 shows the simplest, hence the most interesting, arrangement of this invention: a gas turbine, 60, with the combustion chamber eliminated as a discrete component, allowing for the compressor and the turbine to become integral sections of a single disc stack, 61. Air is drawn into the disc stack at the central opening, 62, as shown by arrows 63, compressed, preferably premixed with fuel, which is then ignited, or it self-ignites, much as in a diesel engine, in the central section, 64, of the disc stack. Hot combustion mixture creates back-pressure, 65, for the compressor section, 66, of the disc stack. As the combustion mixture cools by expansion it moves outward delivering torque to the discs over the turbine section, 67, of the disc stack. In this arrangement there are no losses due to the high tangential velocity of the gas as it leaves the compression section—this in fact accounts for the momentum of the gas entering the turbine section, thus eliminating the nozzle losses of the turbine as well. The excess power, $P_{out}$, is taken up via the common shaft, 68. The gases leave the disc stack at its periphery, 69, as shown by arrows 70. The combustion zone 64 does not have precise boundaries—it may overlap with the compression and expansion zones, providing ample time for thorough burning of the fuel.

For the optimum performance of this type of a gas turbine, unique materials and construction methods are needed.

Warren Rice and his graduate students at Arizona State University have conducted extensive studies of Tesla-type machines, summarized in several publications and in a review presented by Rice at the IV International Nikola Tesla Symposium, Sep. 23-25, 1991, already quoted. A more recent analysis was conducted by Peter Harwood, published in 2008 as his thesis project at Newcastle University, Australia, under supervision of Mark Jones.

Briefly, to achieve near optimum performance using an air-like gas as the working fluid, the discs need to spin at very high RMPs (tens of thousands)—about the only possible material is a continuous carbon fiber, tangentially wound into a disc. The process is shown schematically on FIG. 7. An untwisted carbon fiber tow containing a plurality of carbon filaments, 100, typically of 6 to 7 micrometers in diameter, is wound into a gap 109 between two disks 106 and 107, turning as shown by arrow 108 on a shaft 104, FIGS. 7a and 7b, until the outer diameter of the disc, 105, is reached. A circular shim 103 with the rim 102, placed on the shaft between the disks 106 and 107, defines the opening diameter and the ultimate thickness h of the composite disc, FIG. 7c. The minimum of 1 and preferably only 2 to 3 filaments of diameter d would fit into the gap h. The disks 106 and 107 can be lined by polymeric foils 110 and 111 respectively, the thickness of which, t, is calculated to allow filling up of the gaps between the carbon filaments, forming a matrix of the composite when the polymeric foil is melted and compressed between the disks 106 and 107 as shown by arrows 113. This is preferably done under vacuum.

If the composite discs are to be used at lower temperatures only, e.g. for compressors, fiber types other than carbon, such as KEVLAR® can be used and the foils 110 and 111, ultimately the matrix 112, can be conventional polymers as polyamide, polypropylene, or polyetheretherketone. The resultant mechanical properties of the composite disc are highly anisotropic—with a high modulus in the tangential direction and a very low modulus in the radial direction. The matrix basically keeps the wound fiber in place, but adds very little to stiffness and the strength of the disc.

An alternative to using foils to form the matrix is to use pre-coated filaments as shown on FIG. 8. Polymeric spacers 115 and 116 allow for fitting the filaments 100 with the coating 114 between the disks 106 and 107. Compressed as shown by arrows 117, under needed temperature, the coating of the filaments is converted into matrix 118. The material of the matrix can be either a thermoplast, or a thermoset, e.g. epoxy.

If the disc is to be exposed to high temperature, the matrix must tolerate it and carbon fiber must be protected from oxidation—the best, if not the only choice, is silicon carbide, to be used as a matrix/coating for the carbon fiber. This combination could operate at extreme temperatures, in excess of 1500 deg C., and still resist mechanical forces and oxidation. The preferred technology for producing the matrix/coating of the discs is to convert a suitable polymer into silicon carbide—see for example the U.S. Pat. No. 6,989,428, "Methods of preparing polysilynes", Patricia A. Bianconi et al. Any defects/holes could subsequently be closed by vapor deposition of silicon carbide.

The gaps between the discs needed for near optimum performance for the machines of dimensions suitable for use in e.g. cars, is on the order of 100 micrometers. The entry losses are directly dependent on the change of the cross-section available for the fluid flow just outside to just inside the disc stack. Keeping those losses at a low level, calls for discs as thin as possible. The technology of manufacture proposed herein allows for production of the discs with the thickness on the order of 10 to 25 microns. This not only reduces the inlet losses, but results in a low mass, low cost machine; probably an order of magnitude, both in mass and cost, below all known internal combustion engines.

The very high rotation speeds, needed for optimum performance, result in high internal stresses in the disc—their stretch providing for geometrical precision of the gaps in spite of the relative lack of disc stiffness. The basic gap dimension is controlled by discrete spacers, 123 and 124, integral to the discs and lined along the inner edge 121 and the outer edge 122, respectively, of the disc 120, FIG. 9. The detail of the section A-A, FIG. 9, shows a cylindrical protrusion 151 of the diameter D1 (male side) on one side of the disc body 150 and a ring shaped protrusion 152 on the opposite side with the inner diameter D2 and the outer diameter D3 (female side). D2 is slightly larger than D1 to allow stacking of the discs.

The spacers, however, do not disrupt the main structural organization of the tangentially wound fiber. They are formed in the process of the disc matrix compression within the cavities in the disks 106 and 107 as shown on FIG. 10. The protrusion 151 of diameter D1 is formed in a cavity of depth a; the protrusion 152 in the cavity of depth b. Preferably b is only slightly larger than a and is equal to the desired disc spacing. Furthermore, b is preferably 4 to 10 times larger than the thickness h of the body 150 of the disc.

These same spacers transfer the torque from disc to disc—and ultimately to the end plates, which cover the thin discs, to form the disc stack 200, with the gaps 210, FIG. 11. The areas of the two protrusions 151 and 152 should be about equal so that the torque transfer-generated shear stresses are about the same. The stack is kept together by thick end plates 201 and 202, mechanically connected and compressed only at the inner hole.

FIG. 12 shows a rotor 300 according to the invention, mounted on a shaft of the motor/generator 310. The centrifugal forces at the inner hole of the rotor are low enough to allow construction of a metal hub, 304, from e.g. a titanium alloy. The hub keeps the stack of the discs 301 and the end plates 302 and 303 under axial compression. The thickness of the end plates, 302 and 303, which are, by necessity, also made from a composite, varies with the radius, generally increasing towards the periphery and axially away from the disc stack. Dynamic centrifugal loads 307 induced in these asymmetric plates by rotation create bending moments in the plates 308 and hence a distributed, axial, inward load on the disc stack compensating for the pressure of the working fluid.

The fluid is drawn in at the central opening, 305, and expelled at the periphery of the stack, 306. The rotor 300 and the motor 310 can form a simple, Tesla type compressor, in which case a housing of conventional kind is needed, including inlet vanes that direct the fluid in the axial/tangential direction as indicated by arrows 305 in the cross section and in the top view, FIG. 12. A diffusor volute for the outlet is also called for, including seals between the rotor and the housing. The main advantages offered by the current invention are in the efficiency of machine with the inlet and outlet losses decreased due to very thin discs in comparison to the disc gaps. Furthermore, the disc construction allows for high rotational speeds needed for optimum performance.

However, this same turbo-machine can function as an internal combustion engine or a jet engine. In this case, the motor 310, preferably a high speed, permanent magnet, DC electric motor, is used as a starter to spin the rotor up to the needed speed, and then as a generator, once the fuel is added to the inflow 305 and ignited. Interestingly, the housing now is much simpler—there is basically no need for complex, tight seals—only for inlet vanes to properly direct inflow 305 and for a collector for exhaust gasses 306. If the rotor is designed and operated to result in high speed of exhaust gases, a simple, lightweight jet engine can be made, suitable for powering e.g. helicopters. The preferred use in motor vehicles would be to power a DC generator that charges a battery, i.e. in hybrid vehicles. In such an arrangement the turbo-machine 300 can always operate at its optimum speed. Use of carbon/silicon carbide composite for the rotor can allow operation at very high temperatures—even up to 2000 deg C.—and hence higher thermodynamic efficiency.

FIG. 13a shows an arrangement for a gas turbine, 500, comprising a Tesla-type compressor 501, a combustion chamber 502, a passage 508 for centripetal flow 505 of the combustion mixture and a turbine 503 with centrifugal flow according to this invention. The compressor disc stack 501 is sandwiched between the upper plate of the container 509 and the lower end plate 510, affixed to the shaft 512. The container 509, at its periphery, also encloses the combustion chamber 502, which communicates with the central section of the turbine disc stack 503 via passage 508. The turbine disc stack is sandwiched between the container 509 lower plate and the turbine stack lower end plate 511, affixed to the shaft 512. Power $P_{out}$ is transferred to e.g. electro generator (not shown) via shaft 512. In this arrangement, air (mixed with fuel) enters, as shown by arrow 504, the compressor stack 501 at the central opening and is compressed into the combustion chamber 502. Combustion increases the volume of the combustion mixture pushing it back towards the axis through the passage 508, as shown by arrow 505, before it enters the turbine 503, as shown by arrow 506. Flow of the combustion mixture drives the turbine stack 503 before leaving at the periphery as shown by arrow 507.

FIG. 13b shows a horizontal section through the compressor stack 501. Tangential velocity 514 of the air entering the stack at the inner opening 513 is very modest, determined only by pre-swirl at the intake. As the air spirals out, as shown by the arrows 515, driven by the discs 501, it leaves the periphery of the stack 516 with a tangential velocity 517 close to that of the disc itself. Combustion in the chamber 502 increases several-fold the tangential velocity 518 by which the combustion gases enter the passage 508, as shown on FIG. 13c. As the gases spiral inward, arrow 519, towards the turbine inlet 521, they accelerate further and leave the passage with velocity 520. Depending on the number of discs in the turbine stack, the inlet velocity 522, FIG. 13d, at the inner rim 523 of the turbine discs 503 is many times higher than the rim itself. As the gases spiral out, as shown by arrow 524, they do slow down due to energy transfer to the turbine discs 503, but even at the periphery 525, the tangential velocity 526 of the exhaust gases is higher than that of the rim itself. Most of the power generated by the turbine is used to drive the compressor, as is the case with any such arrangement, but with the high efficiency of all stages, the net power delivered to the shaft is expected to exceed that of any conventional, bladed turbo machine.

It should be noted, that an alternative to combustion of a suitable fuel, this machine could also be powered by external source of heat delivered to the gas after the compression stage, as shown by arrow $Q_{in}$, FIG. 13a. Of particular interest is the solar heat, which by conventional means, e.g. mirrors, could be highly concentrated to increase the temperature of the passing air to very high temperatures, and thus increase the overall thermodynamic efficiency. The discs and the container 509 can be produced from carbon-carbon composites using herein disclosed means.

It is clear that the solutions provided herein for construction and operation of an internal combustion engine, can equally well be applied to a conventional Tesla-type compressor or a turbine, improving their performance, from both, functional and economical aspects. For use at low temperatures, conventional polymers, such as PEEK or polyamide, can be used as the matrix, binding the carbon or other, high strength fibers wound into the discs. An application of particular interest is in medium size air-conditioning system, where high-speed DC electrical motors of 50 kW running at 50 rmp have become a common choice. Use of compressors according to this invention could result in lower production costs and higher efficiency in use.

The invention is directed to a turbo-engine, particularly internal combustion engine, comprising a housing and therein a bladeless turbine section (30; 42; 67) of the stacked disc- or Tesla-type construction, wherein the turbine section (30; 42; 67) has a plurality of closely spaced discs (32; 49; 61) arranged for common rotation about a rotation axis in the housing, said turbine section (30; 42; 67) is adapted for passing with tangential flow components a working fluid stream from a radially inner region to a radially outer region of said turbine section (30; 42; 67) while adopting energy from said working fluid stream for rotating the discs (30; 49; 61). Preferably, the turbo-engine further comprises a compressor section (40; 66) of the stacked disc- or Tesla-type construction having a plurality of closely spaced discs (45; 61) arranged for common rotation about said rotation axis and a combustion zone (41; 64), wherein said compressor section (40; 66) being arranged coaxially with—and radially inwardly of the turbine section (30; 42; 67) with the combustion zone (41; 64) provided radially between the compressor section and the turbine section.

The invention claimed is:

1. A bladeless turbo-engine comprising a housing and a bladeless turbine section of a stacked disc- or Tesla-type construction within the housing, wherein the turbine section comprises a plurality of first closely spaced discs arranged on a common shaft for common rotation about a turbine section rotation axis in the housing, wherein the turbine section is adapted for passing with tangential flow components a working fluid stream from a radially inner region to a radially outer region of the turbine section while adopting energy from the working fluid stream for rotating the discs and thereby rotating the shaft, wherein the turbo engine further comprises a compressor section connected to the turbine section for supplying compressed working fluid to the turbine section, wherein the compressor section is of the stacked disc- or Tesla-type construction having a plurality of second closely spaced discs arranged for common rotation about a compressor section rotation axis, wherein the compressor section is arranged coaxially with, and radially inwardly of, the turbine section.

2. A bladeless turbo-engine comprising a housing and a bladeless turbine section of a stacked disc- or Tesla-type construction within the housing, wherein the turbine section comprises a first portion of a plurality of closely spaced discs arranged on a common shaft for common rotation about a turbine section rotation axis in the housing, wherein the turbine section is adapted for passing with tangential flow components a working fluid stream from a radially inner region to a radially outer region of the turbine section while adopting energy from the working fluid stream for rotating the discs and thereby rotating the shaft, wherein the turbo engine further comprises a compressor section connected to the turbine section for supplying compressed working fluid to the turbine section, wherein the compressor section is of the stacked disc- or Tesla-type construction having a second portion of the plurality of closely spaced discs arranged for common rotation about a compressor section rotation axis, with the turbo engine comprising a combustion zone between the compressor section and the turbine section for supplying a compressed combustion product as working fluid to the turbine section, wherein the second portion of the plurality of closely spaced discs of the compressor section and the first portion of the plurality of closely spaced discs of the turbine section are formed by a stack of closely spaced discs with the compressor section formed by a center portion of the stack of closely spaced discs and with the turbine section formed by a radially outer section of the stack of closely spaced discs, such that the compressor section, the combustion zone and the turbine section are integral sections of the stack of closely spaced discs.

\* \* \* \* \*